United States Patent

Boedecker et al.

[11] Patent Number: 5,924,056
[45] Date of Patent: Jul. 13, 1999

[54] DEVICE AND METHOD FOR MEASURING GRAVITATION

[75] Inventors: Gerd Boedecker, Mühlfeldstr.6, 82152 Planegg; Franz Leismüller, Marstellplatz 8; Karl Hans Neumayer, München, all of Germany

[73] Assignee: Gerd Boedecker, Planegg, Germany

[21] Appl. No.: 08/793,298

[22] PCT Filed: Aug. 30, 1995

[86] PCT No.: PCT/DE95/01180

§ 371 Date: Feb. 26, 1997

§ 102(e) Date: Feb. 26, 1997

[87] PCT Pub. No.: WO96/07113

PCT Pub. Date: Mar. 7, 1996

[30] Foreign Application Priority Data

Aug. 30, 1994 [DE] Germany .......................... 44 30 684.9

[51] Int. Cl.$^6$ .................................................. G01V 7/16
[52] U.S. Cl. .......................... 702/141; 702/150; 702/153; 702/159; 73/178 H; 73/178 R; 342/424
[58] Field of Search .................................. 364/566, 559, 364/571.01; 73/382 R, 382 G, 178 R, 488, 514.01, 178 H; 342/424; 702/141, 150, 153, 159

[56] References Cited

U.S. PATENT DOCUMENTS

| | | | |
|---|---|---|---|
| 3,803,916 | 4/1974 | Dematteo et al. | 73/382 R |
| 3,888,122 | 6/1975 | Black | 73/382 R |
| 4,295,372 | 10/1981 | De Matteo et al. | 73/382 G |
| 4,435,981 | 3/1984 | Carson et al. | 73/382 R |
| 4,550,601 | 11/1985 | Evans | 73/382 R |
| 4,608,641 | 8/1986 | Snell | 701/4 |

FOREIGN PATENT DOCUMENTS 5205075 8/1993 Japan .

OTHER PUBLICATIONS

"Carbone Gravimetry—Merely a Trial or a Method for Determining Gravity on a Profile?"; K. Hehl et al.; IEEE Position Location and Navigation Symposium; Apr. 11, 1994; pp. 376–380.

Primary Examiner—John Barlow
Assistant Examiner—Hien Vo
Attorney, Agent, or Firm—Flehr Hohbach Test; Albritton & Herbert LLP

[57] ABSTRACT

Gravitation in three dimensions is measured using an accelerometer attached to a carrier, a satellite navigation receiver and a computer. The satellite navigation receiver determines a position and attitude, and changes in the position and attitude over time. The computer calculates complete kinematics in inertial space from the timely changes of the determined position and attitude and calculates the gravitation by subtracting the kinematic acceleration from the one observed by the accelerometer. In a preferred embodiment the accelerometer is connected tightly to the carrier. At most, damping elements may be mounted between the accelerometer and the carrier. The accelerometer can be a single accelerometer or a triplet of non-parallel accelerometers. The satellite navigation receiver may be one instrument equipped with three or more antennae or a set of three or more single instruments connected to each other. A time signal of the satellite navigation receiver is used for synchronizing the acceleration measurements. More specifically, the time signal of the satellite navigation receiver may be utilized for controlling the gate time of a counter, which counts an acceleration proportional frequency generated for signal evaluation.

13 Claims, 2 Drawing Sheets

DEVICE AND METHOD FOR MEASURING GRAVITATION

The present invention relates to a device and a method for observing gravitation in accordance with the preambles of the independent claims.

The so called gravimetry or measurement of gravitation has to be classified as a special field of measurement technology, essential for the determination of the gravity field of the earth, thereby for regional and global geodesy, geology or geophysics including exploration, satellite orbit determination, precise navigation especially by inertial navigation instruments etc.

Devices for observing gravity earlier were based on the principle of pendulum observations, today either on the principle of precise tracking of a throw-/fall trajectory (few dm length inside a vacuum chamber) or on the principle of a spring balance (constant mass, determination of force). They also may be assigned to the more general class of accelerometers, as vice versa gravimeters may be seen as accelerometers particularly suited for gravity observations. Gravimeters also stand out from accelerometers in general by their significantly increased natural period. The predominant number of accelerometers or gravimeters, respectively, is based on the principle of a spring balance with constant mass, where frequently (and also for the accelerometers used in this case) the proof mass is kept in a null position also under varying accelerations by a feedback system of a (e.g., capacitive) pickoff and a (e.g., inductive) restoring force; the necessary current is a measure of the acceleration.

The pertinent state of the art is published particularly in TORGE, W.: Gravimetry, DeGruyter, Berlin, New York 1989, and in a conference proceedings volume, COLOMBO, O.(ed.): From Mars to Greenland: Charting Gravity with Space and Airborne Instruments, Symposium no 110, Springer Verlag, New York etc. 1991.

In explanation of a few terms used:

Accuracy/resolution: The term accuracy will be limited to the description of instrumental performance in the sense of a mean error in a usual modeling. For the description of the quality of a solution found for the gravitational field of the earth sought after the term accuracy is dangerous: A quantitative description of the gravitational field of the earth always is the result of many individual observations and a subsequent evaluation, leading somehow to a surface function. The characterizing of the said surface function by an accuracy value would neglect, to what area the said value refers. Because for the mean value of a larger area more values are available in general, a better accuracy value—i.e., a smaller mean error—would be in place for a given task; this—however—contradicts the plausible notion. For this case, the term of resolution is more suitable. Although also not sharply defined, one may imagine the following: The surface function may be approximated by means of e.g., a two dimensional trigonometric series, i.e., by a series of waves of graded wavelengths, in both directions. The wave with the shortest wavelength with a significantly nonzero amplitude corresponds to the resolution. This interpretation also is not totally strict, because e.g., the level of significance and the grading of the wavelength anticipated might be questioned. For our purpose, however, such a discussion is not necessary.

Gravitation: In connection with gravimetry at the earth one usually talks of the gravity field. In the following the term gravitation will be preferred, because—as a matter of fact—predominantly gravitation is dealt with. 'Gravitation' denotes the specific force with the unit $m/s^2$ corresponding to the unit of an acceleration. It is reminded, however, that the so called gravity is composed of the gravitation and the centrifugal acceleration because of the rotation of the earth. The latter amounts to a maximum of 5% of gravitation.

Inertial space: Any change of motion of a mass requires a force and energy, respectively, because of the inertia, even if the near gravitational masses would be removed. A space (thought as empty in the near vicinity) with a reference frame with respect to which motion changes can be observed, is an inertial space.

Attitude: For the geometric coordination of an nonpunctual body to a reference frame it is necessary to know not only its position, but also its direction. It may be named orientation. It is characterized by the angles with respect to the axes of the said reference frame.

One basic difficulty with gravimetry from moving carriers is the fact that on grounds of the principle of equivalence, an accelerometer indicates the sum of gravitational acceleration g and kinematic acceleration b, $a=b+g$. If one is interested in the gravitational acceleration g only, one has to eliminate the kinematic acceleration b (from the motion of the carrier) somehow. In the classical procedure, one uses two complementary methods:

1. The gravimeter is isolated from the rotations of the carrier with the aid of a gyro-stabilized platform, thus the input axis of the sensor is kept vertical.
2. One tries to keep the translational motions small, especially the vertical motions, e.g., by using big aircraft and ships and/or special efforts for stabilizing and steering. The remaining kinematic vertical accelerations b are filtered out by long averaging period for the observations a, such that g remains. To some extent, b is determined also by observations of positions or barometers; this, however, only for the vertical component and without regard of the attitude of the aircraft and its changes.

Because gravitation basically is a vector quantity, a determination of its three components is interesting. Vector gravimetry is not realized yet, one limits oneself to the vertical component.

Conventional airborne or ship borne gravimetry bear a number of drawbacks. It is quite expensive because of gyro-stabilized platforms, bigger vehicles and high steering expenditure.

The gravimeters used are suited only for the determination of the vertical component, vector gravimetry is not possible thereby. Where horizontal components of the acceleration of the carrier are measured anyway, so only because of the correction of the vertical component for the cross-coupling effect. The long natural period of the gravimeters used does not allow an integration in phase with other quantities at a sampling rate of 1 Hertz or more.

The kinematic accelerations b are either not recorded and thus eliminated as stochastic in a low pass filter, hence the filtered signal a is equated with the gravitation g; as far as the kinematic accelerations are recorded, e.g., by determination of the changes of vertical position by means of satellite navigation or barometer, then only in the vertical component; these are also lowpass filtered in general.

The potential of positioning by means of satellite navigation (particularly of the GPS system, "Global Positioning System") for gravimetry until now is utilized only for positioning or vertical acceleration. The potential for the determination of the attitude of the carrier and its changes, which also contribute to the kinematic acceleration, are not utilized.

This way, a higher frequency (1 Hz or more) determination of signals of the gravity field becomes impossible from the beginning and the resolution achieved, e.g., of airborne gravimetry is limited to 10 km or more, therefore a as such desirable greater application is hindered.

Also the hitherto necessary utilization of bigger vehicles limits the operation in lower flight altitudes and more shallow waters, respectively, and consequently the recovery of finer structures of the gravity field.

Also, the possibility has not been utilized so far to make use of the a priori knowledge of the stochastic characteristics of the terrestrial gravity field when filtering the observations.

Therefore, the basis of the present invention is the task to give a generic device and method, respectively, allowing a higher resolution, i.e., a recovery of finer structures of the gravitational field of the earth particularly from an aircraft or ship. Above this, the utilization of more simple device components shall be facilitated. The determination of all three components of the gravitational field of the earth by means of vector gravimetry shall be made possible with adequate accuracy.

According to the invention the objects are solved by the characteristics given in patent claims 1, 8 and 9.

SUMMARY OF THE INVENTION

Gravitation in three dimensions is measured using an accelerometer attached to a carrier, a satellite navigation receiver and a computer. The satellite navigation receiver determines a position and attitude, and changes in the position and attitude over time. The computer calculates complete kinematics in inertial space from the timely changes of the determined position and attitude and calculates the gravitation by subtracting the kinematic acceleration from the one observed by the accelerometer.

In a preferred embodiment the accelerometer is connected tightly to the carrier. At most, damping elements may be mounted between the accelerometer and the carrier. The accelerometer can be a single accelerometer or a triplet of non-parallel accelerometers. The satellite navigation receiver may be one instrument equipped with three or more antennae or a set of three or more single instruments connected to each other.

A time signal of the satellite navigation receiver is used for synchronizing the acceleration measurements. More specifically, the time signal of the satellite navigation receiver may be utilized for controlling the gate time of a counter, which counts an acceleration proportional frequency generated for signal evaluation.

DESCRIPTION OF THE PREFERRED EMBODIMENTS

Figure 1:
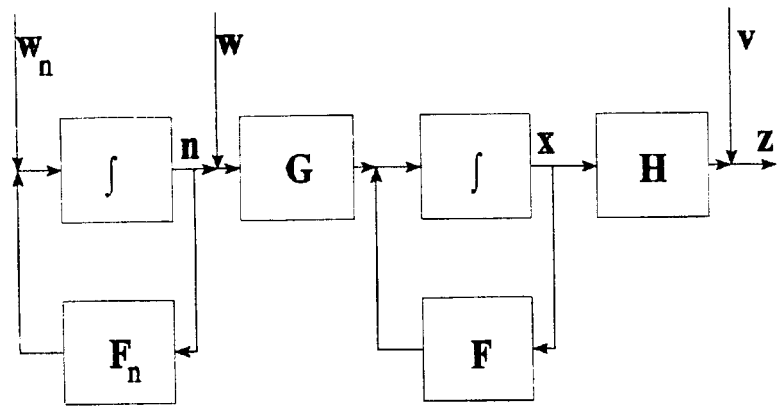
FIG. 1 depicts a filter model for filtering accelerometer measurements.

The invention submitted hereby reduces the necessary expenditure of construction and consequently the costs of observations and increases the spatial resolution and therefore the performance significantly.

The invention is based on the recognition that by means of satellite navigation also the attitude of a carrier bearing the gravitational sensor may be determined. The temporal change of position and attitude, directly transformable to inertial space by means of the satellite navigation system, allows the computation of the kinematic acceleration b including the contribution of the rotation of the carrier and thereby a reduction of the accelerometer signal a according to g=a−b, hence the computation of gravitation, as will be explained in detail below. The contribution to b by the rotation of the carrier is depending e.g., on the arrangement of the accelerometers at the carrier, it is, however, usually so large that it may not be neglected. This confirms the necessity of the determination of the attitude.

In accordance with the instrumental accuracies achieved today, b can be determined by satellite navigation to $10^{-6}$ of the gravitation of the earth and hence about as accurately as a and the accuracy target for g by airborne or ship borne gravimetry; these figures refer to mean values per second.

According to the invention the proposed persistent utilization of satellite navigation makes possible not only the determination of the kinematic acceleration b in one direction but as a full vector $\underline{b}$ (in the following underlining as e.g., $\underline{b}$ explicitly indicates the vector property).

One advantage of satellite navigation is the small phase lag between signal input (change of position) and signal output (quotation of position) and the capability for its calibration. This property is utilized more thoroughly in this case for the determination of (high frequency) accelerations than e.g., for positioning and attitude determination in aerophotogrammetry. This facilitates the integration of b with other observations in phase.

The invention renders possible the utilization of high-grade marketable accelerometers instead of specialized gravimeters. One advantage is the lower price.

These accelerometers may be mounted in any direction, in contrast to specialized gravimeters, therefore they may be fitted firmly to the carrier—at most separated by damping elements. This fact saves the expenditure for a gyro-stabilized platform. The vibrations of the carrier—e.g., because of the engine—in general lead via the so called rectification to a constant bias of the reading of an accelerometer. Because of the constant geometry of the source of vibrations and the accelerometer, errors caused by changes of geometry are avoided—in contrast to when utilizing a gyro stabilized platform.

Another advantage over special gravimeters lies in the shorter natural period, i.e., small phase lag between signal input (acceleration) and output (electrical signal) in the interesting frequency band. This fact renders possible the integration of acceleration with other observations in correct phase.

Consequently, jointly with an accelerometer triplet firmly mounted ("strap down") to the carrier providing the observed acceleration vector a, the determination of the vector of gravitation g becomes possible according to g=$\underline{a}$−$\underline{b}$, i.e., vector gravimetry.

The integration of the two signals a and b mentioned above maintaining their phase relation requires a simultaneous trigger signal for calling both values. For this purpose, the 1 pps (1 pulse per second) signal is used, available in most professional GPS receivers and controlled by atomic clocks aboard the satellites and therefore exhibiting highest precision. This opens the possibility of an integration at a high sampling rate 1 Hertz or more) and realizing of the above formula g=a-b (scalar or vector) for each single observation. The high sampling rate, in turn, makes possible a high spatial resolution of the gravity field from a moving carrier. For example, a sampling rate of 1 Hz in a light propeller aircraft results in one observation per 50 m distance traveled. This is a better basis for a high resolution as with conventional airborne gravimetry, regardless of the filtering necessary in any case.

Another embodiment of the invention is the utilization of the precise time of the satellite navigation system for controlling the readout electronics connected to the accelerometer. The accuracy of the realization of the integration interval has to be in accordance with the accuracy desired for the signal a ; this one, however, is adapted to the desired eventual accuracy of $10^{-6}$ (or better) of the gravitation of the earth. Consequently, using e.g., a sampling rate of 1 Hz, the gate time of the counter used has to be controlled to $10^{-6}$ s (or better). Instead of an otherwise also possible solution using a high-grade clock, the 1 pps-time signal of the satellite navigation system mentioned above was utilized, further reducing the total expenditure.

In the framework of the invention an advanced numerical filtering method is applied. This method is based on the recognition that the main problem of gravimetry aboard moved carriers, the separation of kinematic and gravitational acceleration observations with accelerometers, may be based on the fact that the gravitational field may be considered a stochastic process (i.e., random process), certain parameters of which are known; simply speaking, one knows from experience, by how much on the average gravity field changes over some distance. Knowing the course or the velocity, respectively, of the measuring vehicle, this function of position (more precisely: of the distance) may be transduced to a function of time. These now timely variations of the gravitational contribution to the signal are of low frequency compared to the motions of the carrier (e.g., aircraft or ship). In general, therefore, a lowpass filter for the observation signal a has to be designed in order to compute the low frequency contribution g. The numerical filters used for this purpose so far are using arbitrary methods, for which software is available; the coefficients of these are fitted by experiment in order to achieve an optimum result, i.e., the known a priori information on the stochastic properties of the gravitational field is not utilized. In the framework of this invention the so-called dynamics matrix $F_n$ of a shaping filter as part of a Kalman filter is designed by means of appropriate programs such that the stochastic behavior of the state parameters for the gravitation g corresponds to the stochastic behavior of the real gravitational field. The contribution to the entire invention consists of the development—on the basis of the well known Kalman filtering and shaping filters (c.f. P.S. MAYBECK: Stochastic Models, Estimation and Control, vol. 1 & 2; Academic Press, Inc., Boston etc. 1979 and 1982; particularly vol. 1, p. 8, 180ff, 186ff, 316, 321, 345; vol. 2, p. 54)—of a method for the numerical approximation of the dynamics matrix $F_n$ by the numerically given covariance of the gravitational field (H. K. NEUMAYER: Modellierung stochastisch korrelierter Signalanteile in geodätischen Beobachtungen, angewendet insbesondere auf die Bestimmung des Schwerefeldes aus der Kombination von kinematischen und dynamischen Messungen; Dissertation TU München, erscheint 1995, [Modeling of stochastically correlated signal constituents in geodetic observations, applied particularly to the determination of the gravity field by the integration of kinematic and dynamic observations; PhD dissertation, Technical University Munich, to appear 1995]). The low pass filter designed accordingly therefore is physically based on the stochastic behavior of the gravitational field and hence performs better than a 'physically blind' low pass filter.

The role of $F_n$ in the framework of the filter model is explained by the filter diagram depicted in FIG. 1, where the shaping filter is presented as a subsystem of the total system in the left part and the variables are: $w_n$=white noise driving the shaping filter, $F_n$=dynamics matrix of the shaping filter, n=output of the shaping filter, F=dynamics matrix for the other (deterministic) states, w=white noise driving the main system, x=states, H=observation matrix, v=residuals, z=observations.

Figure 2:
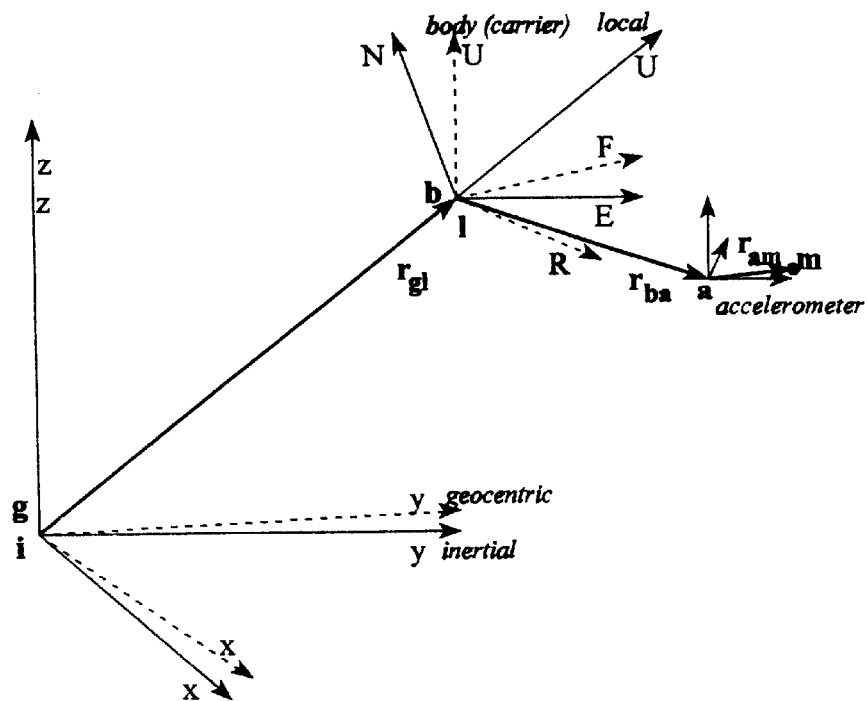
FIG. 2 shows the relationship between geocentric, inertial, accelerometer and carrier reference frames.

The basis of the mathematical-physical model can be explained by means of the following formula and FIG. 2:

$$r_{im} = R_i^g(r_{gi} + R_g^l R_l^b(r_{ba} + R_b^a r_{am}))$$

where the r's are vectors and the R's are rotation matrices, respectively.

In the above formula, the position of a proof mass m of an accelerometer in inertial space is described by the position referred to the accelerometer itself and a sequence of transformations.

The vectors $r_{ij}$ are explained by the sketch in FIG. 2, the $R_i^j$ are rotation matrices between the reference frames. The quantities with indices 'am', 'ba' and 'ab', respectively, are given by instrumental constants and reference to the system of the GPS antennae, which can be determined by a conventional survey; the quantities with indices 'lb', 'lg', and 'gl', respectively, result from GPS positions—and attitude observations. The second derivative of $r_{im}$ with respect to time yields the acceleration in inertial space, denoted by b above. Subtracting the computed kinematic acceleration b from the observed acceleration a, the gravitational acceleration g sought for remains. This quantity is affected by various noise. The filtering has been explained above.

The concept of the solution described is particularly suited for vector gravimetry, in the realization example one accelerometer was used for the time being. The submission leaves the number of accelerometers used open, the presentations are valid for one as also for several.

An accuracy interesting for gravimetry aboard moving carriers is about $1 1 0^{-6} g_0$, where $g_0$ is the earth's gravitation, the kinematic accelerations are also of the order of magnitude of $g_0$. The design has to be in line with these quantities and accuracy, respectively.

For the new method described herein one needs instead of an expensive airborne/ship borne gravimeter (some 100, 000.-DM) a relatively cheap (approximately 10,000.-DM) accelerometer of sufficient resolution, smart electronics for signal processing and a special GPS receiver, that allows to determine not only the position (relative to mm/cm accuracy) but also the attitude of the carrier (to a few 0.01°). A numerical filter described above has to be supplemented.

Figure 3:
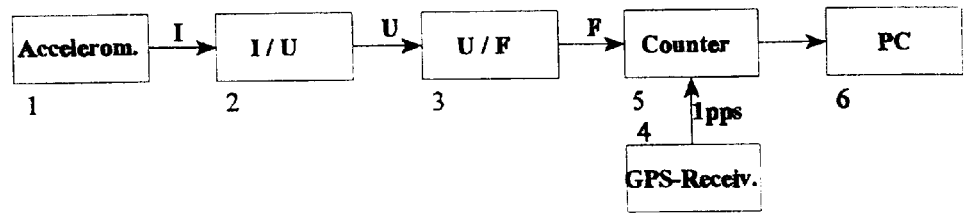
FIG. 3 depicts the signal flow between an accelerometer and a computer (which may be repeated for each of three accelerometers) in a preferred embodiment of the present invention.

With respect to the collaboration of the components and the signal flow, the configuration consists of the following components depicted in FIG. 3:

Reference number 1 denotes one or several high-sensitive accelerometers. Output is an electrical current I proportional to the acceleration (in a defined direction). The raw accelerometer 1 has been mounted into a round borehole of a cube of cast steel.

This one is insulated at its outer faces. The cube is mounted on a plate with levels and three foot screws, this one in turn onto a second plate, which is connected to the carrier (aircraft I ship) via damping elements. The mounting has the following aims: The raw accelerometer as a cylinder with three flanges and a total extension of about 3 cm is oriented unambiguously by the mounting, hence it can be surveyed relative to e.g., satellite navigation antennae with respect to direction and position. The cast steel (if possible authentic steel), by its combined characteristics of heat capacity, heat conductivity and small thermal expansion in connection with the insulating coating, takes care that abrupt ambient temperature changes cause only small and slow temperature changes in the accelerometer 1 itself; these are measured internally and used for corrections. Active thermal control becomes obsolete by this construction. The mass of the steel cube in connection with mechanical damping elements cause the damping of high frequency vibrations of the aircraft. The foot screws, in connection with bubbles, allow to put the accelerometer into the plumb-line.

The varying current I is transduced to a varying voltage U by means of a current-voltage transducer.

The voltage U controls a frequency F by means of a VCO (voltage controlled oscillator 3. The components 2, 3 are adapted to current I from the accelerometer 1 as to generate a frequency of about 2 MHz at an acceleration $g_0$.

The GPS-receiver 4 emits every second position (3D, relative to mm), velocity and attitude of the aircraft, i.e., roll, pitch and heading in a global system. Further, one pulse per second can be utilized. Because the internal clock of the receiver is controlled by the atomic clocks aboard the GPS satellites, the time pulse ("1 pps") is better than $1 \times 10^{-6}$. Instead of a receiver of the GPS system also a similarly designed receiver in a different satellite positioning system may be used, e.g., of the GLONASS system. GPS currently is most widely used.

The counter electronics 5 has the following characteristics: Once per second it counts approximately $10^6$ oscillations F from the VCO 3. The 1 pps signal of the GPS receiver 4 guarantees that the acceleration values from the accelerometer 1 and from the GPS receiver 4 be taken strictly simultaneous. Furthermore, the high accuracy of the 1 pps better than $1 \times 10^{-6}$ guarantees the number of oscillations be counted correctly by precisely realizing the counter gate time. The counter electronics 5 also serves for the 1 pps-pulse conditioning. Two single counters in the electronics count alternating and without any dead time. In the currently non-busy counter the digital value of 21 bit word length is passed to a recording PC 6.

EXAMPLE

The configuration as mentioned in the text above, has been realized with the following instruments/components:

Accelerometer 1 of Sundstrand company, QA 3000-20

Current-Voltage transducer 2 by standard component with low drift and low temperature effect Voltage controlled oscillator 3 as standard component with low drift and low temperature sensitivity GPS-receiver 4: Ashtech3DF of Ashtech company Counter electronics 5

PC 6: notebook

In connection with the embodiment the utilization of the GPS system was anticipated. Likewise, a different suitable satellite navigation system could be utilized, currently e.g., GLONASS.

Figure 4A:
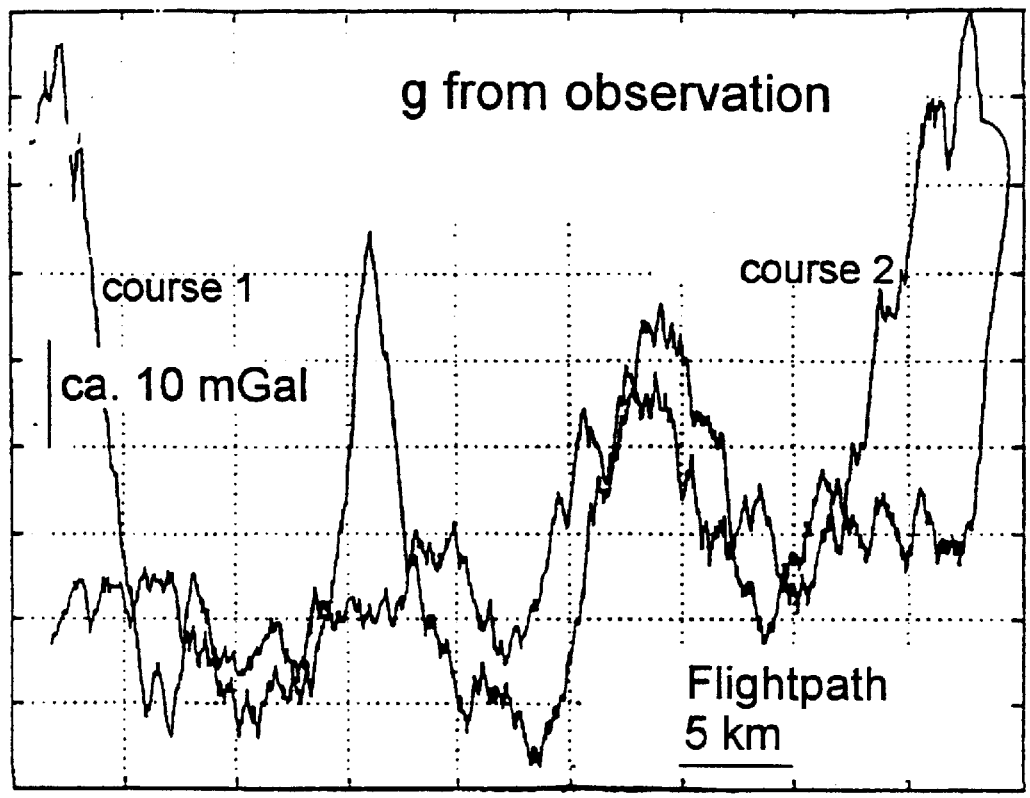
FIGS. 4A shows the vertical component of gravitation as measured during a flight over a part of the Bavarian Alps using the present invention.
Figure 4B:
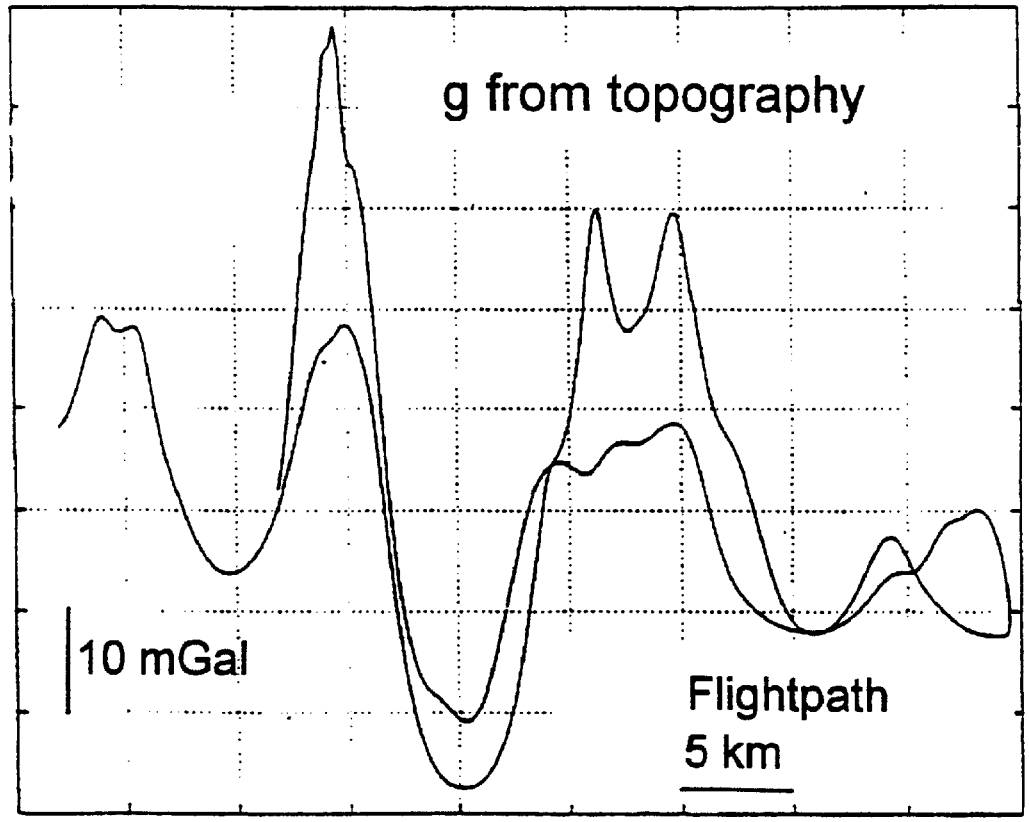
FIG. 4B shows gravitation along the same flight path computed solely from topographic data.

FIG. 4 depicts the graphical representation of preliminary results of a test flight over a part of the Bavarian Alps using the above equipment in a one-engine propeller aircraft of the type Cessna 206. The GPS antennae were mounted to the top side of the aircraft, the very small and compact instrumental equipment was in the interior of the aircraft, where the accelerometer was connected firmly to the aircraft via the seat rails. The digital mean accelerometer readings every second were stored in a notebook computer, the GPS observations taken simultaneously were stored in the receiver itself. The synchronization utilized the 1 pps signal. As is usual process in geodetic GPS observations, a reference receiver at the airport was used, because only differential observations guarantee a sufficient accuracy. The data were processed afterwards, i.e., the formula given above was evaluated, the second derivative with time taken for the inertial accelerations, these subtracted from the measurements of the accelerometer and the result filtered consistent with the filter model presented above. The result for the vertical component of gravitation is depicted in the FIG. 4A; the referring profile was about 38 km in length, a profile shifted by about 5 km was taken for the return flight. One recognizes the stabilization phase of the numerical filter at the beginning (upper left) and after the turn (right), respectively. In FIG. 4B one can see the values of gravitation along the flight path computed from topographic data. The vertical extension of a partial diagram is equivalent to about 80 mGal=80 $10^{-5}$ ms$^{-2}$. Because the topography explains only a part of the variations of gravitational field, a conclusive error estimation is not possible using this way only, an accuracy of 10 mGal has been achieved already along with a high resolution; it seems that an accuracy of 1 mGal along with a spatial resolution of 1 to 3 km by airborne measurements very likely can be achieved. Maintaining the concept, further improvements of details should allow an accuracy improvement to 0.5 to 0.1 mGal.

We claim:

1. A device for the measurement of gravitation, comprising:

an accelerometer attached to a carrier for observing acceleration of the carrier, a satellite navigation receiver attached to the carrier, and a computer coupled to the satellite navigation receiver and the accelerometer, characterized in that the satellite navigation receiver determines a position and attitude, and the computer calculates complete three-dimensional kinematics, including three-dimensional kinematic acceleration, in inertial space from timely changes of the determined position and attitude and calculates the gravitation by subtracting the kinematic acceleration from the acceleration of the carrier observed by the accelerometer.

2. The device of claim 1, characterized in that the accelerometer is connected tightly to the carrier, where at most damping elements may be mounted between the accelerometer and the carrier.

3. The device of claim 1, characterized in that the accelerometer is selected from the set consisting of a single accelerometer and a triplet of non-parallel accelerometers.

4. A device for the measurement of gravitation, comprising:

an accelerometer attached to a carrier for observing acceleration of the carrier;

a satellite navigation receiver attached to the carrier; and a computer coupled to the satellite navigation receiver and the accelerometer;

wherein the satellite navigation receiver determines a position and attitude, and the computer calculates complete three-dimensional kinematics, including three-dimensional kinematic acceleration, in inertial space from timely changes of the determined position and attitude and calculates the gravitation by subtracting the kinematic acceleration from the acceleration of the carrier observed by the accelerometer; and the satellite navigation receiver is selected from the set consisting of one instrument equipped with three or more antennae and a device of three or more single instruments connected to each other, which allow the determination of the attitude angles.

5. A method measuring three-dimensional gravitation using an accelerometer and a satellite navigation receiver attached to a carrier, comprising the steps of:

measuring acceleration of the carrier with the accelerometer;

utilizing the satellite navigation receiver to determine a three-dimensional position and attitude and changes thereof over time; and determining, from the changes in three-dimensional position and attitude over time, complete three-dimensional kinematics, including three-dimensional kinematic acceleration, of the carrier in inertial space, and combining the measured acceleration of the carrier with the determined three-dimensional kinematic acceleration in order to generate the three-dimensional gravitation.

6. The method of claim 5, characterized in that a time signal of the satellite navigation receiver is utilized for the observation of acceleration.

7. The method of claim 6, characterized in that the time signal of the satellite navigation receiver is used for the synchronization of the acceleration measurement.

8. A method measuring three-dimensional gravitation using an accelerometer and a satellite navigation receiver attached to a carrier, comprising the steps of:

measuring acceleration of the carrier with the accelerometer;

utilizing the satellite navigation receiver to determine a three-dimensional position and attitude and changes thereof over time; and determining, from the changes in three-dimensional position and attitude over time, complete three-dimensional kinematics, including three-dimensional kinematic acceleration, of the carrier in inertial space, and combining the measured acceleration of the carrier with the determined three-dimensional kinematic acceleration in order to generate the three-dimensional gravitation;

characterized in that the time signal of the satellite navigation receiver is utilized for controlling a gate time of a counter, which counts an acceleration proportional frequency generated for signal evaluation.

9. The method of claim 8, characterized in that the signal transduced to an acceleration proportional frequency is evaluated in a constant sampling rate alternately by two counters such that no dead time occurs.

10. A method measuring three-dimensional gravitation using an accelerometer and a satellite navigation receiver attached to a carrier, comprising the steps of:

measuring acceleration of the carrier with the accelerometer;

utilizing the satellite navigation receiver to determine a three-dimensional position and attitude and changes thereof over time; and determining, from the changes in three-dimensional position and attitude over time, complete three-dimensional kinematics, including three-dimensional kinematic acceleration, of the carrier in inertial space, and combining the measured acceleration of the carrier with the determined three-dimensional kinematic acceleration in order to generate the three-dimensional gravitation;

characterized in that the acceleration values output by the accelerometer and the determined position and attitude from the satellite navigation receiver are input to an integrating digital filter.

11. The method of claim 10, characterized in that the digital filtering is performed using a shaping filter fit to stochastic behavior of a gravity field.

12. The method of claim 7, characterized in that the time signal of the satellite navigation receiver is utilized for controlling a gate time of a counter, which counts an acceleration proportional frequency generated for signal evaluation.

13. The method of claim 5, including tightly coupling the accelerometer to the carrier, where at most damping elements may be mounted between the accelerometer and the carrier.

* * * * *